UNITED STATES PATENT OFFICE.

OTTO GÜRTH, OF WEISSENFELS, GERMANY.

EXTRACT FOR COLORING WORT OR BEER AND THE MANUFACTURE THEREOF.

SPECIFICATION forming part of Letters Patent No. 687,746, dated December 3, 1901.

Application filed October 20, 1900. Serial No. 33,789. (No specimens.)

*To all whom it may concern:*

Be it known that I, OTTO GÜRTH, a subject of the King of Prussia, Emperor of Germany, residing at Weissenfels, Germany, have invented a certain new and useful Extract for Coloring Wort or Beer and the Manufacture Thereof; and I do hereby declare the following to be a full, clear, and exact description of the invention.

This invention relates to an extract and to the manufacture thereof, which extract is prepared from products or materials resulting from or used in breweries and is adapted for coloring any wort or beer and is especially intended to be used as a substitute for the brown dark color obtained from roasted sugar.

This extract is to be preferred to roasted malt or to beer employed for coloring purposes (which materials must be used in comparatively large quantities for the purpose) on account of its agreeable aromatic taste and its capacity to give to the beer a full or substantial taste.

The manufacture of this extract is based upon a process consisting in its essential parts in treating wort (such as derived from barley, rice, maize, wheat, or mixtures thereof) with yeast passed over into self-fermentation and in then roasting this mixture.

The product of the present invention can be obtained in the following manner, which also explains, by way of example, the present process of manufacture: Washed and pressed yeast is allowed to stand at suitable temperature, commonly at the ordinary temperature of the chamber, so as to be left to a self-decomposition, which may be readily determined by the smell or odor. The decomposition of the said yeast is complete if it has become thin, liquid, or soup-like. The time of decomposition depends upon the kind of yeast and upon the temperature employed. In the most favorable case, however, several days are necessary for the decomposition. The stronger the decomposition the more efficient and better adapted is the yeast for producing the coloring-wort or the coloring-extract. Thereupon to each liter of beer-wort, containing, for example, about sixteen per cent. of solid or extractive substances, according to the degree of decomposition of the so decomposed yeast, twenty to twenty-five grams of the latter are added, and this mixture is then heated, preferably with stirring or shaking, to an elevated or middle temperature—as, for instance, 40° to 50° centigrade. After some time (usually from twenty-four to forty-eight hours) the product has received the desired properties. Thereupon it is evaporated, which evaporation may be assisted by a vacuum, and then the concentrated mass is roasted, as by means of a gas-burner, preferably in an open cylindrical vessel with an arched or convex bottom. A temperature of 200° to 250° centigrade gives good results. The proportions and temperatures may of course be varied. When the mass has been roasted, it is then dissolved in water and filtered. The liquid so obtained may be evaporated or diluted according to the desired concentration. The extract so obtained can be added to the beer to be colored before or after the fermentation or during the same.

For the manufacture of the extract of the present invention any worts of brewery may be employed—as, for instance, worts of barley, rice, maize, wheat, &c., or mixtures thereof.

I claim as my invention—

1. Process of producing an extract for coloring worts or beers from any desired worts, such as worts from barley, wheat, rice, maize or mixtures thereof, by mixing with such materials yeast which has passed over into self-fermentation, digesting this mixture, concentrating the same and roasting the product of this concentration, substantially as and for the purpose set forth.

2. Process of producing an extract for coloring worts or beers, from any desired wort, such as worts from barley, wheat, rice, maize and mixtures thereof, by mixing with such materials yeast which has passed over into self-fermentation, and with other albuminous brewery substances, such as hop, waste of brewery and the like, digesting this mixture, concentrating the same and roasting the product of this concentration, substantially as and for the purpose set forth.

3. As a new product of manufacture, a color for wort or beer, essentially consisting of a roasted mixture of the solid components of malt and of albuminous brewery substances, substantially as and for the purpose set forth.

In testimony whereof I have signed my name to this specification in the presence of two subscribing witnesses.

OTTO GÜRTH.

Witnesses:
JOHANNES D. HEIN,
WOLDEMAR HAUPT.